US012725414B2

(12) United States Patent
Yadav et al.

(10) Patent No.: US 12,725,414 B2
(45) Date of Patent: Sep. 1, 2026

(54) FINE-GRAINED ACTIVITY RECOGNITION USING MACHINE LEARNING

(71) Applicant: Oracle International Corporation, Redwood Shores, CA (US)

(72) Inventors: Sourabh Yadav, Bengaluru (IN); Amit Agarwal, Bengaluru (IN); Sandeep Jana, Bengaluru (IN); Kulbhushan Pachauri, Bengaluru (IN)

(73) Assignee: Oracle International Corporation, Campbell, CA (US)

( * ) Notice: Subject to any disclaimer, the term of this patent is extended or adjusted under 35 U.S.C. 154(b) by 263 days.

(21) Appl. No.: 18/412,705

(22) Filed: Jan. 15, 2024

(65) Prior Publication Data

US 2025/0232584 A1 Jul. 17, 2025

(51) Int. Cl.
*G06V 20/40* (2022.01)
*G06V 10/22* (2022.01)
(Continued)

(52) U.S. Cl.
CPC ............ *G06V 20/41* (2022.01); *G06V 10/235* (2022.01); *G06V 10/764* (2022.01);
(Continued)

(58) Field of Classification Search
CPC .... G06V 20/41; G06V 10/235; G06V 10/764; G06V 10/774; G06V 10/82; G06V 40/23; G06V 20/46; G06N 3/045; G06N 3/08
See application file for complete search history.

(56) References Cited

U.S. PATENT DOCUMENTS 12,465,280 B1 * 11/2025 Jalali ...................... A61B 5/112
2015/0099252 A1 * 4/2015 Anderson .............. G06T 7/251
434/257

(Continued)

OTHER PUBLICATIONS

Wu et al, "Hand-object Interaction based Semi-automatic Objects Annotation for Human Activity Datasets", 2022 IEEE 24th International Workshop on Multimedia Signal Processing (MMSP), IEEE, Sep. 26, 2022, 6 pages.

(Continued)

*Primary Examiner* — Iriana Cruz
(74) *Attorney, Agent, or Firm* — Hickman Becker Bingham Ledesma LLP; Stephen J. Walder, Jr.

(57) ABSTRACT

The present disclosure relates to a custom framework for fine-grained human activity recognition. One or more input videos may be accessed, where the one or more input videos comprise one or more frames depicting one or more actors and one or more objects. A plurality of object-pose interaction graphs may be generated for individual frames from the one or more input videos based at least in part on one or more objects of interest from the one or more objects and on one or more joint keypoints of the one or more actors. A first graph neural network may be trained based at least in part on the plurality of object-pose interaction graphs to identify spatial information for the one or more actors, the one or more objects of interest, and one or more interactions between the one or more actors and the one or more objects of interest. A second graph neural network may be trained based at least in part on the plurality of object-pose interaction graphs and one or more keyframes from the plurality of frames to identify temporal information for the one or more actors, the one or more objects of interest, and the one or more interactions between the one or more actors and the one or more objects of interest. A classifier may be trained (Continued)

to identify one or more actions in the one or more input videos based at least in part on the spatial information and the temporal information.

22 Claims, 6 Drawing Sheets

(51) Int. Cl.
*G06V 10/764* (2022.01)
*G06V 10/774* (2022.01)
*G06V 10/82* (2022.01)
*G06V 40/20* (2022.01)

(52) U.S. Cl.
CPC ............ *G06V 10/774* (2022.01); *G06V 10/82* (2022.01); *G06V 40/23* (2022.01)

(56) References Cited

U.S. PATENT DOCUMENTS

2019/0304104 A1* 10/2019 Amer .................... G06F 40/216
2020/0394499 A1* 12/2020 Yao ...................... G06N 3/0455
2021/0081782 A1* 3/2021 Lakshmi Narayanan .................. G06F 16/909
2022/0405501 A1* 12/2022 Chowdhury ........... G06V 10/82
2023/0093087 A1* 3/2023 Babinowich ......... G06V 10/774 345/423
2025/0238581 A1* 7/2025 Zhou ....................... G06T 13/40
2025/0278853 A1* 9/2025 Zhao ...................... G06V 20/49

OTHER PUBLICATIONS

Tomei et al, "STAGE: Spatio-Temporal Attention on Graph Entities for Video Action Detection", arxiv.org, Jul. 7, 2020, URL:https://arxiv.org/pdf/1912.04316v2, 12 pages.
Singh et al., "A Novel Approach to Spatio-Temporal Video Analysis and Retrieval", In: "Computer Vision/Computer Graphics Collaboration Techniques, Mirage 2009, Lecture Notes in Computer Science", May 4, 2009, 10 pages.
Qiao et al., "Geometric Features Informed Multi-person Human-object Interaction Recognition in Videos", Jul. 19, 2022, URL:https://arxiv.org/pdf/2207.09425>, 18 pages.
Morais et al., "Learning Asynchronous and Sparse Human-Object Interaction in Videos", 2021 IEEE/CVF Conference on Computer Vision and Pattern Recognition (CVPR), IEEE, Jun. 20, 2021, 10 pages.
Huang et al, "Modeling Sub-Actions for Weakly Supervised Temporal Action Localization", IEEE Transactions on Image Processing, vol. 30, May 13, 2021, 14 pages.
Yang et al., Temporal Pyramid Network for Action Recognition, Jun. 15, 2020, pp. 1-10.
Shao et al., Temporal Interlacing Network, The Thirty-Fourth AAAI Conference on Artificial Intelligence (AAAI-20), 2020, pp. 11966-11973.
Microsoft: What is Spatial Analysis?, https://learn.microsoft.com/en-us/azure/ai-services/computer-vision/intro-to-spatial-analysis-public-preview, Jun. 2023, pp. 1-5.
Google: Prepare video training data for action recognition, https://cloud.google.com/vertex-ai/docs/video-data/action-recognition/prepare-data, Jun. 2023, pp. 1-6.
Amazon: People Pathing, https://docs.aws.amazon.com/rekognition/latest/dg/persons.html, Jun. 2023, pp. 1-9.
Yan et al., "Spatial Temporal Graph Convolutional Networks for Skeleton-Based Action Recognition." Proceedings of the AAAI Conference on Artificial Intelligence (AAAI), vol. 32, Feb. 2018 https://arxiv.org/abs/1801.07455 (10 pages).
Wang et al., "Non-local Neural Networks." Proceedings of the IEEE Conference on Computer Vision and Pattern Recognition (CVPR), 2018, pp. 7794-7803. , Jun. 18-23, 2018. Published by IEEE. https://arxiv.org/abs/1711.07971 (10 pages).
Shi et al., ."Two-Stream Adaptive Graph Convolutional Networks for Skeleton-Based Action Recognition." Proceedings of the EEE/CVF Conference on Computer Vision and Pattern Recognition 2019 https://arxiv.org/abs/1805.07694 (10 pages).
Girdhar et al., "Video Action Transformer Network." Proceedings of the IEEE/CVF Conference on Computer Vision and Pattern Recognition (CVPR), 2019, pp. 244-253. Published by IEEE. https://arxiv.org/abs/1812.02707 (10 pages).
Carreira et al., "Quo Vadis, Action Recognition? A New Model and the Kinetics Dataset." Proceedings of the IEEE Conference on Computer Vision and Pattern Recognition (CVPR), 2017, https://arxiv.org/abs/1611.08050 (10 pages).
Cao et al., "Realtime Multi-Person 2D Pose Estimation Using Part Affinity Fields." Proceedings of the IEEE Conference on Computer Vision and Pattern Recognition (CVPR), pp. 7291-7299 2019 https://arxiv.org/abs/1611.08050 (9 pages).

* cited by examiner 100
103
Keyframe Selection 106
Object Localization 109
Assisted Labeling Interface 112
Multi-Object Tracking 115
Custom Object Detection 118
Keypoint Estimation 121
Object-Pose Interaction Graph Creation 127
Spatio-Temporal Graph 130
Object of Interest-Pose Interaction 124
Activity Classification 133

FINE-GRAINED ACTIVITY RECOGNITION USING MACHINE LEARNING

TECHNICAL FIELD

The present disclosure relates to automated recognition of activities from video data.

BACKGROUND

Detecting fine-grained, human actions in videos presents a challenging problem for computer vision and deep learning. Fine-grained actions include actions that, despite a human body having a similar pose when performing each action, have different meanings based on their context and how the human body is interacting with different objects in each action. Likewise, fine-grained actions can include actions in which a human body uses different poses to interact with the same object. Fine-grained actions occur in a multitude of different settings and industries, including healthcare, manufacturing, retail, and fitness. Automated recognition of fine-grained actions from videos could therefore be beneficial in each of these settings and industries.

Fine-grained action recognition in video suffers from several issues. For example, these actions are often diverse and specific to different environments and industries. This diversity and specificity make it impracticable to train a single machine learning model to recognize all of these actions. As another example, training such a machine learning model requires a massive volume of video data to be annotated. In addition to the difficulty of obtaining a sufficient volume of video data, annotating the video data is a time-consuming and costly process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to a custom framework for fine-grained human activity recognition. The disclosed fine-grained human activity recognition framework solves problems with fine-grained activity recognition by, for instance, enabling a machine learning model to be trained for a particular context and/or a specific industry with a minimal amount of data and relatively little effort. The fine-grained human activity recognition framework accomplishes this by exploiting human and object interactions.

The fine-grained human activity recognition framework goes beyond video classification by dividing the problem into several sub-tasks and deriving an optimal solution for each sub-task. Features learned from these sub-tasks may then be used to create two-stage graph neural networks (GNNs) that implicitly learn human-object interactions and the spatial and temporal relationships between them. These two-stage GNNs may enable recognition of multiple fine-grained actions performed by multiple different humans in a single scene. For example, in a video, one human may be recognized as performing one action, while another human may be recognized as performing a completely different action. These sub-tasks may be handled by individual modules that may be extensible, scalable, and upgradeable based on a user's industry-specific use case.

The framework accomplishes fine-grained human activity recognition with minimal training data and minimal effort in labeling. In some examples, as few as five to ten video clips may be used to properly classify a particular action. Labeling efforts may be minimized by using assisted labeling and keyframe detection.

The fine-grained human activity recognition framework may offer fine-tuned control over different sub-tasks and provide easily understood feedback. As mentioned above, the modules handling these sub-tasks may be customized using tunable parameters for a particular use case or industry. And because the fine-grained human activity recognition framework is modular, feedback may be derived from the output of each individual module to gain insights as to which modules may be underperforming.

Thus, the fine-grained human activity recognition framework may provide useful, actionable insights for improving the performance of the framework. For example, the framework may compute scores for each sub-task, which provide insights that such as accuracy scores that enable the accuracy of each sub-task to be assessed and improved.

Training Pipeline

Figure 1:
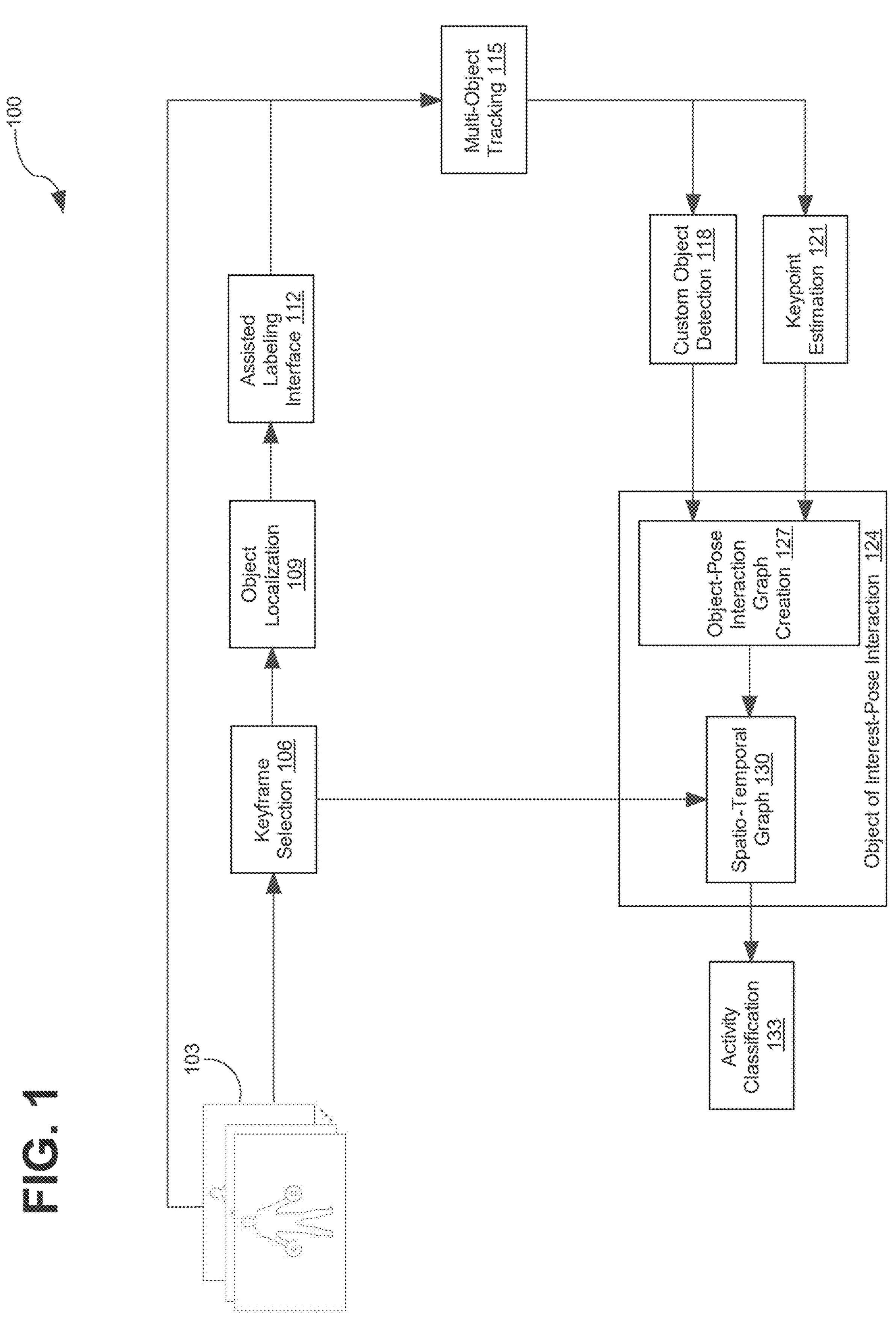
FIG. 1 shows a block diagram that depicts an example of a training pipeline for a fine-grained activity recognition framework.

FIG. 1 shows a block diagram that depicts an example of a training pipeline 100 for a fine-grained activity recognition framework, in an embodiment. Training the fine-grained activity recognition framework may begin with a user providing several training input videos 103 that depict the performance of a particular class of action. The number of training input videos 103 used may depend on the action or on other factors, though in some examples five to ten training input videos 103 may be used.

Each training input video 103 may be processed by a keyframe selection module 106. The keyframe selection module 106 may detect particular frames within the training input video 103. These "keyframes" may be selected based on one or more factors. For example, a keyframe may be selected based on the presence of significant objects within a scene, where the significance of an object could depend on an industry associated with the training input videos 103. As another example, a keyframe may be selected based on a pose of an actor depicted in the training input videos 103 changing significantly. These factors may be customized by a user based on a relevant use case or industry.

In some implementations, the keyframe selection module 106 may select keyframes using an ensemble of techniques. For example, the keyframe selection module 106 may use machine learning techniques such keyframe selection based on scene-change detection, object-based keyframe detection, motion-based keyframe selection, and/or unsupervised learning techniques such as deep clustering. Thus, a keyframe may be defined based on heuristics such as a change to an object, a change in background, or a change of scene in a training input video 103 and/or based on one or more deep learning techniques. In some implementations, how many keyframes are selected may depend on a use case or scenario associated with the training input videos 103. For example, training input videos 103 depicting actions performed very quickly may result in more keyframes being selected than for training input videos 103 depicting mostly a static background. In some implementations, the keyframe selection module 106 may combine results of these different techniques by, for example, prioritizing a keyframe based on common detection by multiple of the techniques. If a total number of detected keyframes falls below a minimum threshold, then the keyframe selection module 106 may select those keyframes with the highest confidence scores and that do not overlap with previously selected keyframes.

In some implementations, one or more settings of the keyframe selection module 106 may be modified to increase or decrease a threshold for selecting keyframes, which may accordingly increase or decrease the number of keyframes selected. This threshold may represent, for example, an input parameter that enables a use to control the sensitivity of the keyframe selection module 106 based on a relevant use can and industry. value. In some implementations, the keyframe selection module 106 may exclude one or more frames of the training input videos 103 from training based on, for example, an amount of action or movement in the one or more frames falling below a predetermined threshold. Likewise, a training input video 103 may be excluded from training if that training input video 103 includes a number of keyframes that falls below a predetermined threshold. These thresholds may be set and modified by a user. The user may also have the option to override the exclusion of any frames or training input videos 103.

The keyframes may be provided to an object localization module 109, which may identify the individual objects within particular scenes depicted in the keyframes of each training input video 103. Object localization module 109 may include a machine-trained model that has been trained to localize different objects within bounding boxes and to distinguish different objects from each other.

The localized objects and keyframes may then be used by an assisted labeling interface module 112 to enable annotation of the keyframes. The assisted labeling interface module 112 may provide a user interface that may enable a user to assign a label to the localized objects within the keyframes that indicates a category of the object. For example, a user can label an object as a "barbell" and another as a "dumbbell." Likewise, the assisted labeling interface module 112, through the user interface, enable a user to label any objects of interest (including actors) depicted in each keyframe. The user may select which of the objects identified by the object localization module 109 from the keyframes will be labeled as objects of interest for the depicted class of action, as well as any actors depicted in the keyframes performing the action. In some implementations, to annotate a keyframe, a user may click or otherwise interact with portions of the keyframe that include objects that the user deems to be objects of interest. The assisted labeling interface module 112 may then label these objects as objects of interest. Likewise, the user can click or otherwise interact with portions of the keyframe that include actors so that they may be labeled accordingly. The user may also interact with any of the localized object within the keyframes to assign a category label to an object, which may be selected from a predefined list of categories or provided by the user.

A multi-object tracking module 115 may receive the labeled objects of interest in the keyframes from the assisted labeling interface module 112, as well as the training input videos 103, and track the objects of interest-including actors-across every frame of the training input videos 103. The user may annotate objects of interest in just the keyframes, and the multi-object tracking module 115 may detect and annotate the objects of interest in all other frames of the training input videos 103. Thus, the multi-object tracking module 115 may propagate the objects of interest from the keyframes to intermediate frames of the training input videos 103. The multi-object tracking module 115 may match objects of interest in keyframes with those in other frames based on, for instance, features such as color, texture, and motion. The multi-object tracking module 115 may handle objects that are occluded by predicting a location of the object based on a previous trajectory. The multi-object tracking module 115 may not, however, differentiate between types of objects (e.g., dumbbells versus barbells) or between inanimate objects and actors in some implementations.

Object and actor data from the object tracking data generated by the multi-object tracking module 115 may be provided to two different, parallel modules: a custom object detection module 118 and a keypoint estimation module 121.

The objects of interest from every frame of the training input videos 103 may be aggregated and provided to the custom object detection module 118. The custom object detection module 118 may detect and generate bounding boxes that denote locations of objects of interest within each frame. The custom object detection module 118 may train a custom object detection model using the tracked objects of interest from the multi-object tracking module 115. The custom object detection model 118 may be trained to detect objects of interest associated with various classes of actions within a particular scene from a training input video 103. The custom object detection module 118 may likewise learn to differentiate between different types of objects and between objects and actors. During training, the custom object detection module 118 may leverage techniques like transfer learning or continual learning to achieve high accuracy even with limited available training data. The custom object detection module 118 may be configurable to use different object detection machine learning models depending on the application or use case of the fine-grained activity recognition framework.

In some implementations, the custom object detection module 118 may be trained to detect only objects of interest and not actors. In other implementations, however, the custom object detection module 118 may be trained to detect both objects of interest and actors.

The custom object detection module 118, in some implementations, also be customized based on a user's industry-specific use case.

The tracked actor from every frame of the training input videos 103 may be provided to the keypoint estimation module 121. The keypoint estimation module 121 may detect joint keypoints of the actor entity by predicting the three-dimensional coordinates of the actor's joints from two-dimensional video input. The joint keypoints may include joints of the actor-points of articulation connecting two or more components of the actor. The keypoint estimation module 121 may estimate the location of joint keypoints in each frame of the training input videos 103. A machine learning model may, using two-dimensional images from the frames of the training input videos 103, generate a heat map for each joint. These heat maps may then be used to estimate the three-dimensional coordinates of the joints. This estimation may take into account temporal information from multiple video frames. The keypoint estimation module 121 may output, for each keypoint, XYZ coordinates and an index number identifying the particular keypoint. The keypoint estimation module 121 may generate absolute values representing the locations of respective joint keypoints.

Data associated with the detected objects of interest and joint keypoints for each frame of the training input videos 103 may be provided to an object-pose interaction module 124. The object-pose interaction module 124 may include an object-pose interaction graph creation submodule 127 and a spatio-temporal graph creation submodule 130. The object-pose interaction graph creation submodule 127 may determine the visual, spatial, and geometric relationships between the one or more detected actors and the one or more detected objects of interest within each frame of the one or more training input videos 103. Based on these relationships, the object-pose interaction graph creation submodule 127 may generate a frame-level graph for each frame of the one or more training input videos 103. Rather than having learned weights, object-pose interaction graph creation submodule 127 may create the frame-level graphs based on the detected objects of interest and the keypoints. Weights of the object-pose interaction graph creation submodule 127 may initially be randomized, but these weights may be fine-tuned through training to represent features of the detected objects of interest and joint keypoints. In addition, training may incorporate training on the nodes of the frame-level graphs. This may enable the object-pose interaction graph creation submodule 127 to learn scenarios in which some of the objects of interest or joint keypoints are occluded or otherwise not detected. This may also increase the volume of training data available to better take advantage of cases where pre-existing training data is minimal.

A frame-level graph may represent the visual, spatial, and geometric relationship between the actors and the object of interest in its corresponding frame, where each actor and object of interest may be represented by a node. Each joint keypoint of an actor may be represented by an actor node. In some implementations, each object may be represented by a single node located at a center point of the object, at a boundary point of the object, or at any other pertinent points of the object, depending on the particular object, use case, industry, or other factors. In other implementations, an object may be represented by multiple object nodes if, for example, that object includes multiple subparts that may interact with each other or interact with an actor in different ways.

Thus, the frame-level graph may include one or more actor nodes corresponding to each actor and one or more object nodes corresponding to each object depicted in the particular frame. Each node in a frame-level graph may be associated with node features. The node features for an actor node may be created using, for instance, a feature map representing the visual features of a region of the actor node's corresponding keypoint. Likewise, the node features for an object node may be created using a feature map representing the visual features of the corresponding object of interest, as one example. In addition, the nodes in a frame-level graph may each be associated with a node embedding. A node embedding may capture the node features and spatial information of a particular node.

A frame-level graph may be represented by, for instance, an adjacency matrix. An adjacency matrix A may be an n×n matrix, where n is a number of nodes in a given frame of an inference input video 203. Each row and each column of the adjacency matrix A can correspond to a particular node. Each value of the adjacency matrix A can represent a relationship (or edge) between a first node and a second node, where the first node corresponds to the value's row within the adjacency matrix A, and the second node corresponds to the value's column within the adjacency matrix A. Each value of the adjacency matrix A can be a vector of n dimensions. Each vector can represent features of the actor and object nodes generated by the custom object detection module 118 and the keypoint estimation module 121. The adjacency matrix A may be initialized using the locations of the nodes. Alternatively, the adjacency matrix A may be initialized using values representing the spatial locations of the objects of interest and the joint keypoints. Within the training pipeline 100, the values of the adjacency matrix A may be converted to edge embeddings comprising vectors that represent interaction between two nodes.

The spatio-temporal graph creation submodule 130 may generate spatio-temporal graphs based on the frame-level graphs generated during the object-pose interaction graph creation stage 127, as well as on keyframes selected by the keyframe selection module 106. The spatio-temporal graph creation submodule 130 may include, for example, a two-stage graph neural network. In some implementations, the spatio-temporal graph creation submodule 130 may employ a graph attention network v2 (GATv2) architecture with skip connections inspired by DeepGCN.

In a first stage of the graph neural network, the spatio-temporal graph creation submodule 130 may learn the visual, spatial, and geometric relationships between the actor nodes and object nodes within each frame-level graph. The spatio-temporal graph creation submodule 130 may learn and transform the node embeddings and edge embeddings for each frame based on neighboring frames.

The spatio-temporal graph creation submodule 130 may generate a spatio-temporal graph by merging the frame-level graphs between each of the keyframes. For example, suppose a training input video 103 is thirty seconds long and includes one keyframe at the ten second mark and one keyframe at the twenty second mark. In that example, the spatio-temporal graph creation submodule 130 may generate one spatio-temporal graph by merging the frame-level graphs corresponding to 0-10 s of the inference input video 203, one spatio-temporal graph by merging the frame-level graphs corresponding to 10-20 s of the inference input video 203, and one spatio-temporal graph by merging the frame-level graphs corresponding to 20-30 s of the inference input video 203. The spatio-temporal graph may thereby introduce a temporal dimension to the relationships and interactions captured by the frame-level graphs. The spatio-temporal graph creation submodule 130 may be resilient to misclassifications or other errors in previous modules of the training pipeline 100 because of this merging of frame-level graphs.

In a second stage of the graph neural network, the spatio-temporal graph creation submodule 130 may pool features of the frame-level graphs corresponding to each keyframe in a temporal dimension. The spatio-temporal graph creation submodule 130 may learn temporal embeddings for nodes and edges of the spatio-temporal graphs. Doing so enables the spatio-temporal graph creation submodule 130 to learn features of the objects of interest and actors from across the plurality of frame-level graphs.

During training of the graph neural network, because the frame-level graphs are pooled, the graph neural network may better generalize over any misclassifications by the custom object detection module 118 or the keypoint estimation module 121 over relatively few frames. In addition, the graph neural network may generalize over training input videos 103 in the case of misclassifications by dropping, masking, and padding frames during pooling. Keyframes may also be substituted to nearest neighboring frames to make the graph neural network more robust to errors by the keyframe detection module 121. Similarly, keyframes may be dropped as a part of the graph augmentation process to increase the graph neural network's generalizability and robustness to misclassifications by the keyframe detection module 121.

Classifier 133 may then use the spatio-temporal graphs to classify an action being performed in the training input videos 103. The classifier 133 may pool across the spatio-temporal graphs for fine-grain action recognition. One or more action classes from the keyframes may be pooled to predict actions depicted in the one or more training input videos 103. In some implementations, the classifier 133 may use multi-layer perceptrons (MLPs) to classify actions performed by human nodes with respect to objects of interest as individual fine-grained activities. The classifier 133 may classify one or more activities from training input videos 103 using MLPs based on features of the actor nodes and object nodes of interest across the one or more spatio-temporal graphs. Every actor node may inherently capture the contextual information of object nodes corresponding to objects of interest with which the actor is interacting.

In some implementations, data may be collected from one or more modules of the training pipeline 100 to calculate an accuracy score for each module. Doing so allows the accuracy of each module to be evaluated. For example, the label generated by the classifier 133 may be compared with a ground truth label provided by the user to determine whether the classifier's 133 label is accurate. An accuracy score may be generated based on how often the classifier's 133 label matches the ground truth label. As another example, a mean average precision (mAP) value may be calculated for the custom object detection module 118 to score the accuracy of its object detections—by, for instance, comparing object bounding boxes generated by the custom object detection, module 118 with ground truth bounding boxes.

These module-specific accuracy scores may enable a user to determine which of the modules are contributing to potentially inaccurate classification results. Low module-specific accuracy scores may be caused by, for example, inaccuracy of a module itself, or by issues with the user-provided training input videos 103, such as occlusion of an object of interest within a training input video 103. For example, low accuracy scores may result when attempting to classify a video of an actor lifting a barbell from a side view, when training included training input videos 103 of an actor lifting a barbell from a front view. As another example, low accuracy scores may result when a barbell is not detected in a video of an actor lifting a barbell. In situations such as these, feedback detailing these issues may be provided to the user.

Inference Pipeline

Figure 2:
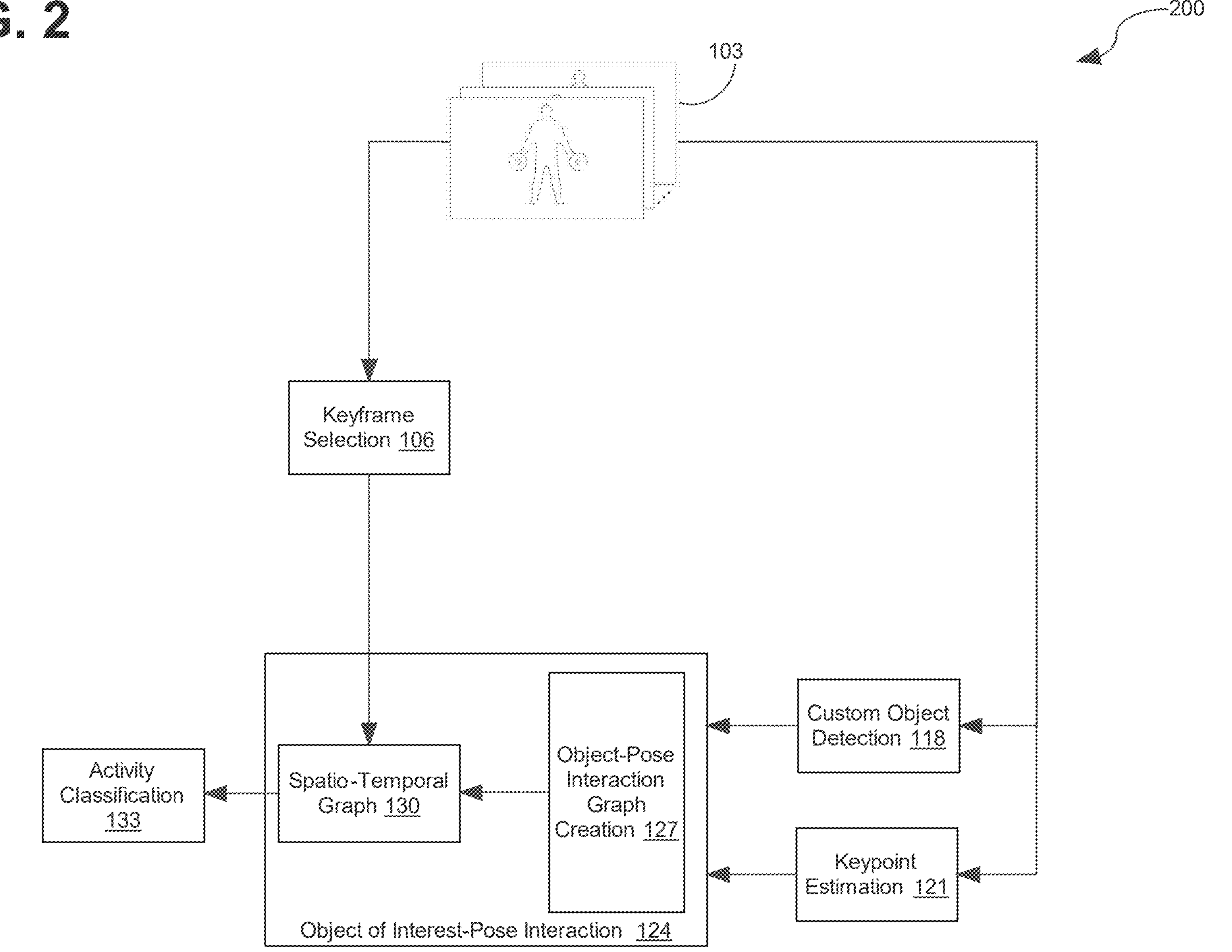
FIG. 2 shows a block diagram that depicts an example of an inference pipeline for a fine-grained activity recognition framework.

FIG. 2 shows a block diagram that depicts an example of an inference pipeline 200 for a fine-grained activity recognition framework. One or more inference input videos 203 may be received for classification by the inference pipeline 200. The frames of the one or more inference input videos 203 may be provided to the custom object detection module 118 and the keypoint estimation module 121. The custom object detection module 118 may detect one or more objects within each frame of the one or more inference input videos 203 based on the training received within the training pipeline 100 and generate bounding boxes for each detected object. In some implementations, the custom object detection model 118 may also detect one or more actors within each frame of the one or more inference input videos 203 if the custom object detection module 118 was trained to do so within the training pipeline 100. Otherwise, the keypoint estimation module 106 may detect one or more actors within each frame of the one or more the inference input videos 203. The keypoint estimation module 121 may also detect joint keypoints for each detected actor in each frame of the one or more inference input videos 203.

The object-pose interaction module 124 may receive the detected objects of interest from the custom object detection module 118 and the estimated joint keypoints from the keypoint estimation module 121. The object-pose interaction graph creation submodule 127 may learn, at the frame level, the visual, spatial, and geometric relationship between the actors and the object of interest. The object-pose interaction graph creation submodule 127 may generate a plurality of frame-level graphs. Each object of interest and joint keypoint depicted in a particular frame may be a node in the corresponding frame-level graph.

Each node may have a node embedding that represents a set of features of the node. Node features may include visual features of a corresponding object or of a corresponding keypoint region. Edge features may represent relative spatial information of nodes and interactions between nodes.

The frame-level graphs may be passed through a two-stage GNN of the spatio-temporal graph creation submodule 130 to predict one or more actions depicted in the keyframes of the one or more inference input videos 203. In the first stage of the GNN, the spatio-temporal graph creation submodule 130 may learn the visual, spatial, and geometric relationships between the nodes from the frame-level graphs. The spatio-temporal graph creation submodule 130 may then generate spatio-temporal graphs by merging the frame-level graphs between each of the keyframes. In the second stage of the GNN, the spatio-temporal graph creation submodule 130 may learn interactions and temporal features of the nodes across the spatio-temporal graphs. In some implementations, the spatio-temporal graph creation submodule 130 may generate a single spatio-temporal graph, capturing temporal relationships by treating each of the frame-level graphs as a single node. In some implementations, one or more of the actors from the inference input videos 203 may be identified, and the actions performed by the one or more of the actors may be tracked.

The classifier 133 may then classify one or more actions depicted in the one or more inference input videos 203 based on the spatio-temporal graphs. The classifier 133 can classify an action performed by each actor depicted in the inference input videos 203, which may include multiple actions being classified within a single inference input video 203. The classifier 133 can employ, for example, a multi-layer perceptron. Action classes from the keyframes may be pooled to predict activities depicted in the one or more inference input videos 203. The classifier 133 may predict an action class for each actor node, thereby enabling recognition of actions performed by each actor depicted in the one or more inference input videos 203.

In some implementations, action classes from the keyframes may be used to index the corresponding inference input video 203 to enable video search functionality. For example, a particular inference input video 203 may be identified as depicting a weightlifting action using a barbell in one or more of its keyframes. In that case, the inference input video 203 may be indexed with the term "weightlifting" or other term identifying the depicted action and stored in a data store accessible to the fine-grained activity recognition framework. The indexed inference input video 203 may then be identified by searching for videos depicting "weightlifting" using a search interface or by other keyword search functionality as can be appreciated.

Assisted Labelling Interface

Figure 3A:
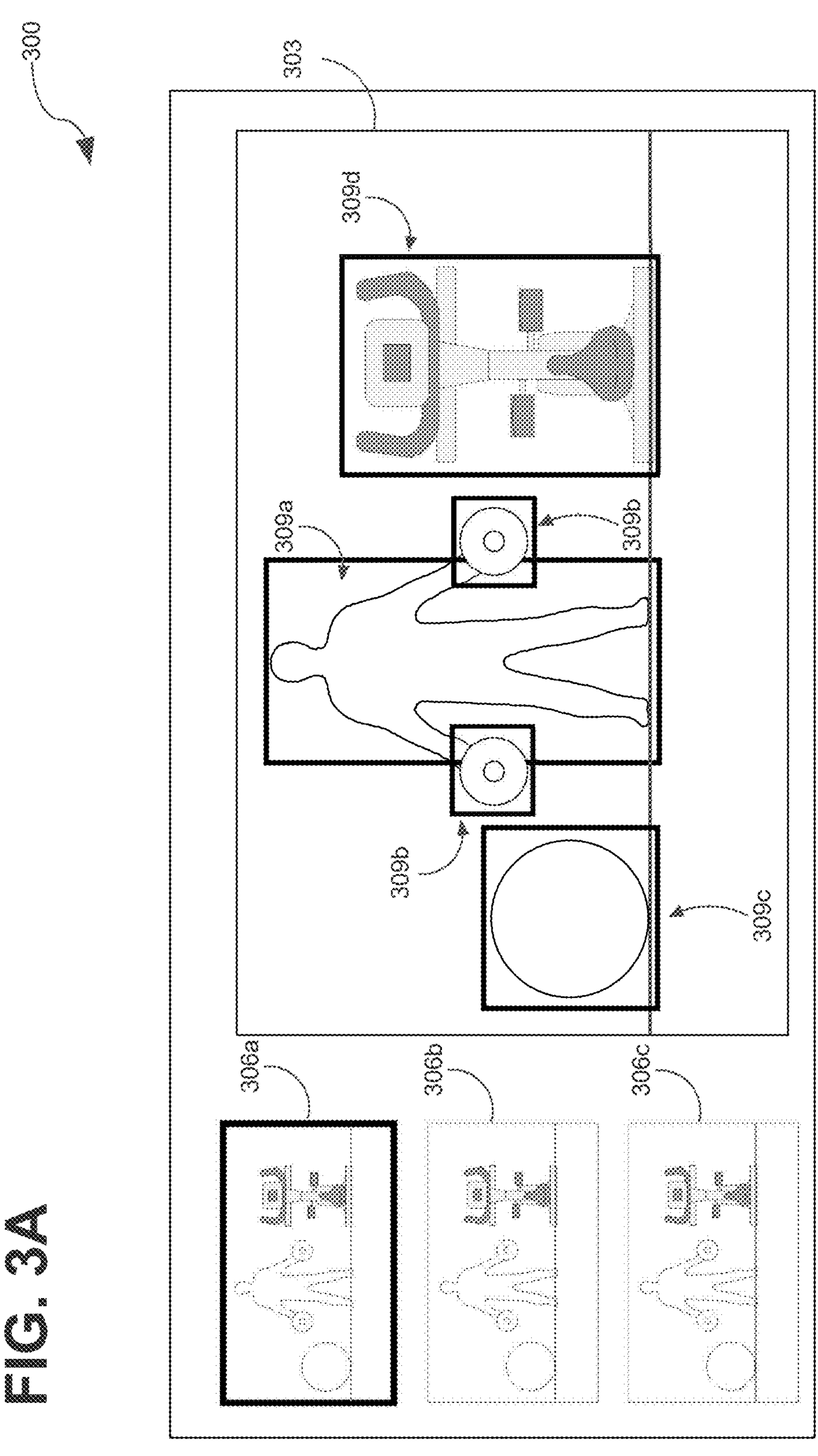
FIGS. 3A-3B show examples of an assisted labeling interface.
Figure 3B:
Figure 3B:
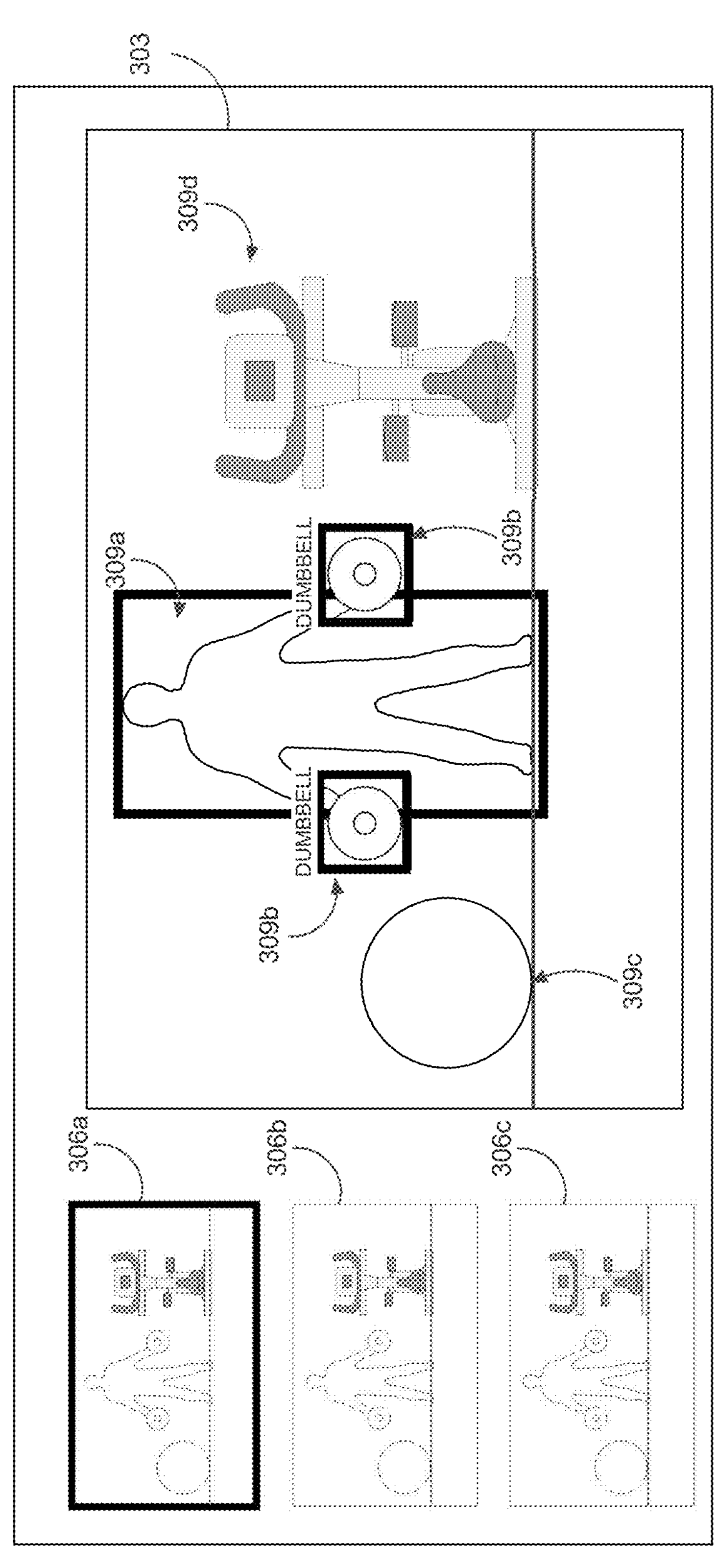

FIGS. 3A-3B show examples of an assisted labeling interface 300. The assisted labeling interface 300 may enable a user to assign labels to objects or actors that are involved in the performance of actions depicted in one or more input videos. The assisted labeling interface 300 can be generated by the assisted labeling interface module 112 and rendered in a display of a client computing device accessible by the user. The assisted labeling interface 300 may include a labeling pane 303 and one or more selectable keyframes 306.

The assisted labeling interface module 112 may receive one or more keyframes identified by the keyframe selection module 106 and one or more objects detected by the object localization module 109, each of which may be identified from one or more input videos provided by the user. The assisted labeling interface module 112 may then generate the assisted labeling interface 300 for rendering in the display of the user's client computing device.

The one or more keyframes identified by the keyframe selection module 106 may be displayed in the assisted labeling interface 300 as one or more selectable keyframes 306. One of the one or more selectable keyframes 306 may be selected by a user, which may cause the assisted labeling interface module 112 to display the selected keyframe within the labeling pane 303. Within the labeling pane 303, the user may annotate the selected keyframe to identify one or more objects of interest. For example, the user may select an object identified by the object localization module 109 to label that object as an object of interest.

FIG. 3A shows a selectable keyframe 303*a* that is selected and displayed in the labeling pane 303. In the labeling pane 303, several objects 309 are each demarcated by a bounding box. These objects 309 are object identified by the object localization module 109. In this example, the labeling pane 303, shows a human actor object 309*a*, two dumbbell objects 309*b*, an upright bicycle machine object 309*c*, and a medicine ball object 309*d*, each of which is demarcated by a bounding box. The assisted labeling interface 300 may enable a user to select or deselect any of these objects 309 to label the object 309 as an object of interest or assign a category label to the object 309. As an example, FIG. 3B shows the labeling pane 303 after the user has labeled some of the depicted objects 309 as objects of interest and assigned category labels to some of the depicted objects 309. In this example, the human actor object 309*a* and the two dumbbell objects 309*b* have been selected as objects of interest and labelled "dumbbell" accordingly.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
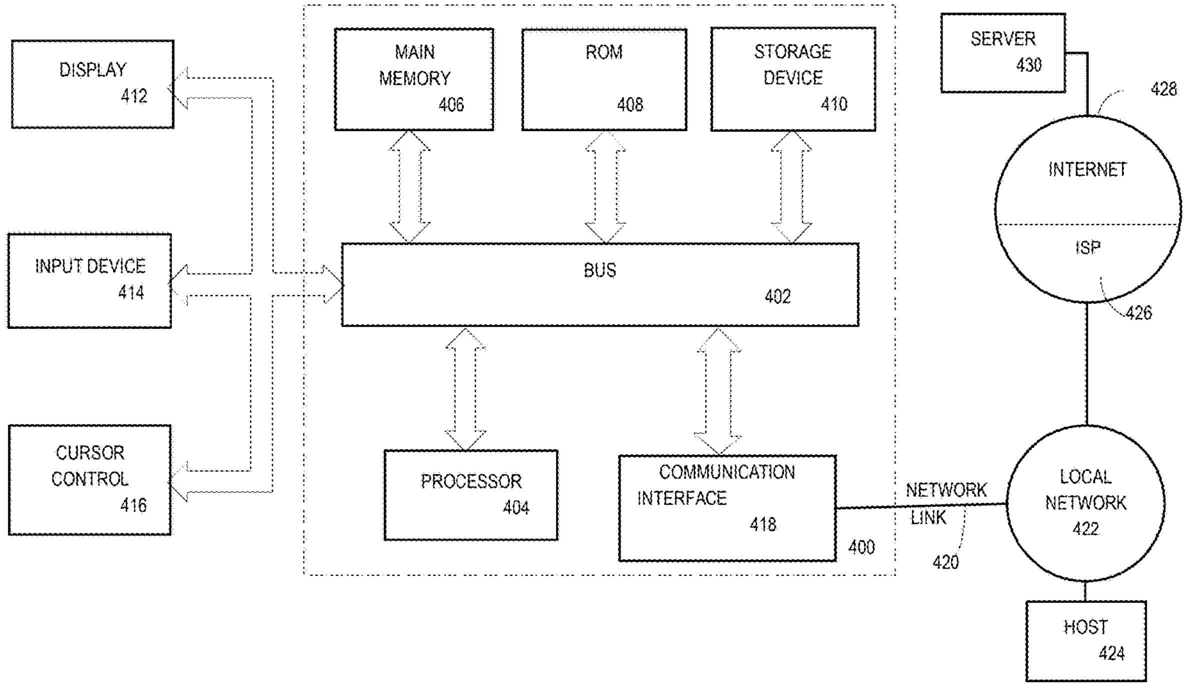
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
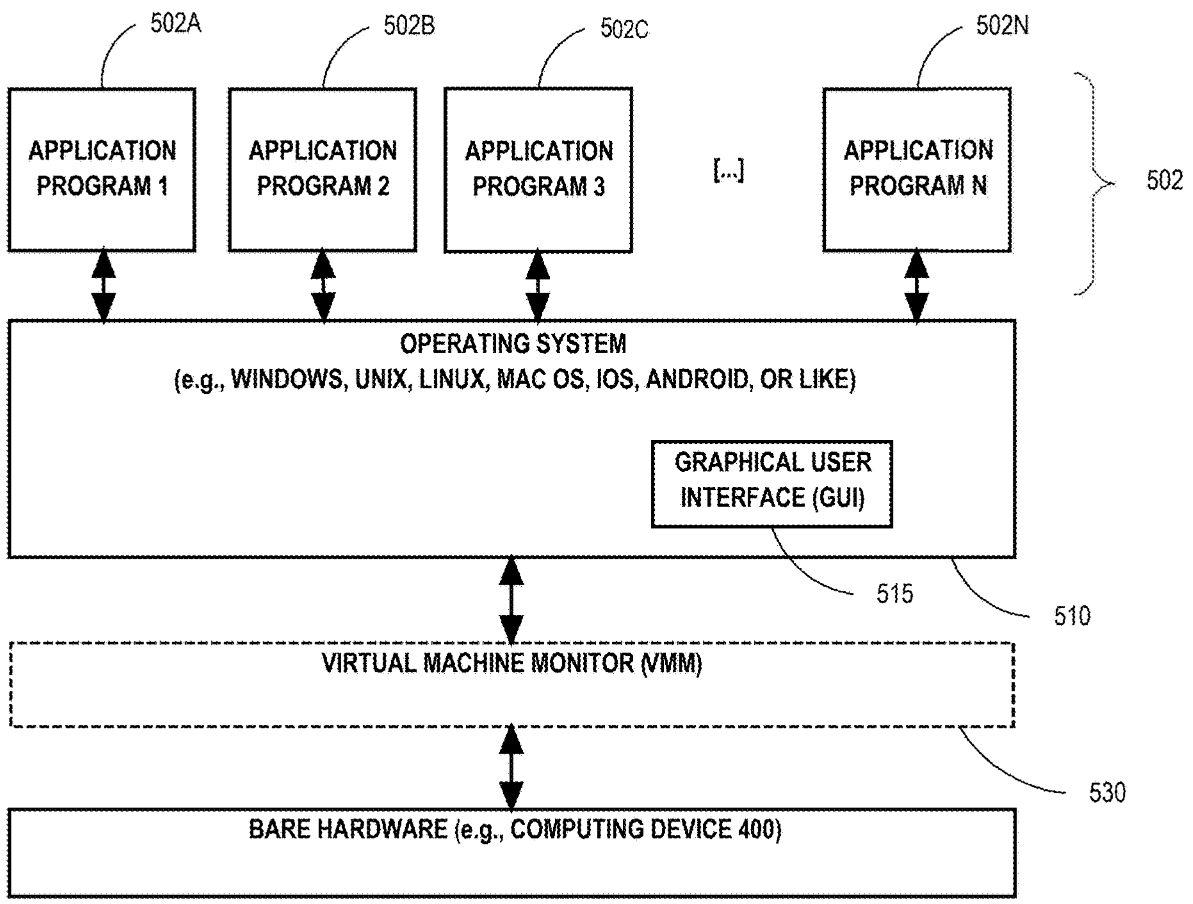
FIG. 5 is a block diagram of a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

accessing one or more input videos comprising a plurality of frames depicting one or more actors and one or more objects;

selecting, from the plurality of frames, one or more keyframes based on predefined keyframe selection factors that are based on content of frames, wherein a number of the one or more keyframes is less than a number of frames in the plurality of frames;

generating a plurality of object-pose interaction graphs for individual frames from the plurality of frames based at least in part on one or more objects of interest from the one or more objects and on one or more joint keypoints of the one or more actors, the object-pose interaction graphs representing:

relative spatial information for the one or more actors and the one or more objects of interest, and one or more interactions between the one or more actors and the one or more objects of interest;

training a first graph neural network based on the plurality of object-pose interaction graphs to identify spatial information for the one or more actors, the one or more objects of interest, and the one or more interactions between the one or more actors and the one or more objects of interest;

training a second graph neural network based on an association between the one or more keyframes and the object-pose interaction graphs of one or more other frames, in the plurality of frames, to identify temporal information for the one or more actors, the one or more objects of interest, and the one or more interactions between the one or more actors and the one or more objects of interest; and training a classifier to identify one or more actions in the one or more input videos based at least in part on the spatial information and the temporal information.

2. The method of claim 1, further comprising localizing the one or more objects within the one or more keyframes.

3. The method of claim 1, further comprising causing rendering on a client computing device a user interface comprising one or more selectable components corresponding to the one or more keyframes, and the user interface enabling a user to designate at least a portion of the one or more objects as the one or more objects of interest.

4. The method of claim 1, further comprising training an object detection model to detect, within the plurality of frames, the objects of interest.

5. The method of claim 4, wherein the object detection model is trained based at least in part on tracking the objects of interest from the one or more keyframes within one or more intermediate frames.

6. The method of claim 1, further comprising estimating one or more joint keypoints associated with the one or more actors within the plurality of frames.

7. The method of claim 1, further comprising:

merging a first portion of the plurality of object of interest-pose interaction graphs corresponding to a first keyframe of the one or more keyframes;

generating a first spatio-temporal graph based at least in part on the merged first portion of the plurality of object of interest-pose interaction graphs;

merging a second portion of the plurality of object of interest-pose interaction graphs corresponding to a second keyframe of the one or more keyframes; and generating a second spatio-temporal graph based at least in part on the merged second portion of the plurality of object of interest-pose interaction graphs, wherein the second graph neural network is trained to identify the temporal information from the first spatio-temporal graph and the second spatio-temporal graph.

8. The method of claim 7, wherein identifying the one or more actions in the one or more input videos based at least in part on the spatial information and the temporal information comprises pooling one or more action classes from the one or more keyframes across the first spatio-temporal graph and the second spatio-temporal graph.

9. A method comprising:

accessing one or more input videos comprising a plurality of frames depicting one or more actors and one or more objects;

generating a plurality of object-pose interaction graphs for individual frames from the plurality of frames based at least in part on one or more objects of interest from the one or more objects and on one or more joint keypoints of the one or more actors, the object-pose interaction graphs representing:

relative spatial information for the one or more actors and the one or more objects of interest, and one or more interactions between the one or more actors and the one or more objects of interest;

training a first graph neural network based at least in part on the plurality of object-pose interaction graphs to identify spatial information for the one or more actors, the one or more objects of interest, and the one or more interactions between the one or more actors and the one or more objects of interest;

training a second graph neural network based at least in part on the plurality of object-pose interaction graphs and one or more keyframes from the plurality of frames to identify temporal information for the one or more actors, the one or more objects of interest, and the one or more interactions between the one or more actors and the one or more objects of interest;

training a classifier to identify one or more actions in the one or more input videos based at least in part on the spatial information and the temporal information;

generating a first accuracy score based at least in part on an identification of the one or more keyframes;

generating a second accuracy score based at least in part on a localization of the one or more objects within the one or more input videos;

generating a third accuracy score based at least in part on a detection of the objects of interest within the individual frames of the one or more input videos;

generating a fourth accuracy score based at least in part on an identification of the one or more joint keypoints within the individual frames of the one or more input videos;

generating a fifth accuracy score for the graph neural network; and generating a sixth accuracy score for the classifier based at least in part on a comparison of a classification of an action within an input video with a ground-truth label for the action.

10. The method of claim 1, wherein training a classifier to identify one or more actions in the one or more input videos based at least in part on the spatial information and the temporal information further comprises:

training the classifier to identify a plurality of actions in one of the one or more input videos.

11. One or more non-transitory storage media storing instructions which, when executed by one or more computing devices, cause:

accessing one or more input videos comprising a plurality of frames depicting one or more actors and one or more objects;

selecting, from the plurality of frames, one or more keyframes based on predefined keyframe selection factors that are based on content of frames, wherein a number of the one or more keyframes is less than a number of frames in the plurality of frames;

generating a plurality of object-pose interaction graphs for individual frames from the plurality of frames based at least in part on one or more objects of interest from the one or more objects and on one or more joint keypoints of the one or more actors, the object-pose interaction graphs representing:

relative spatial information for the one or more actors and the one or more objects of interest, and one or more interactions between the one or more actors and the one or more objects of interest;

training a first graph neural network based at least in part on the plurality of object-pose interaction graphs to identify spatial information for the one or more actors, the one or more objects of interest, and the one or more interactions between the one or more actors and the one or more objects of interest;

training a second graph neural network based on an association between the one or more keyframes and the object-pose interaction graphs of one or more other frames, in the plurality of frames, to identify temporal information for the one or more actors, the one or more objects of interest, and the one or more interactions between the one or more actors and the one or more objects of interest; and training a classifier to identify one or more actions in the one or more input videos based at least in part on the spatial information and the temporal information.

12. The method of claim 1, wherein the training of the second graph neural network comprises merging object-pose interaction graphs of subsets of frames, in the plurality of frames, associated with corresponding ones of the one or more keyframes, to introduce a temporal dimension to the one or more interactions.

13. The one or more non-transitory storage media of claim 11, wherein the instructions, when executed by the one or more computing devices, further cause localizing the one or more objects within the one or more keyframes.

14. The one or more non-transitory storage media of claim 11, wherein the instructions, when executed by the one or more computing devices, further cause causing rendering on a client computing device a user interface comprising one or more selectable components corresponding to the one or more keyframes, and the user interface enabling a user to designate at least a portion of the one or more objects as the one or more objects of interest.

15. The one or more non-transitory storage media of claim 11, wherein the instructions, when executed by the one or more computing devices, further cause training an object detection model to detect, within the plurality of frames, the objects of interest.

16. The one or more non-transitory storage media of claim 15, wherein the object detection model is trained based at least in part on tracking the objects of interest from the one or more keyframes within one or more intermediate frames.

17. The one or more non-transitory storage media of claim 11, wherein the instructions, when executed by the one or more computing devices, further cause estimating one or more joint keypoints associated with the one or more actors within the plurality of frames.

18. The one or more non-transitory storage media of claim 11, wherein the instructions, when executed by the one or more computing devices, further cause:

merging a first portion of the plurality of object of interest-pose interaction graphs corresponding to a first keyframe of the one or more keyframes;

generating a first spatio-temporal graph based at least in part on the merged first portion of the plurality of object of interest-pose interaction graphs;

merging a second portion of the plurality of object of interest-pose interaction graphs corresponding to a second keyframe of the one or more keyframes; and generating a second spatio-temporal graph based at least in part on the merged second portion of the plurality of object of interest-pose interaction graphs, wherein the second graph neural network is trained to identify the temporal information from the first spatio-temporal graph and the second spatio-temporal graph.

19. The one or more non-transitory storage media of claim 18, wherein identifying the one or more actions in the one or more input videos based at least in part on the spatial information and the temporal information comprises pooling one or more action classes from the one or more keyframes across the first spatio-temporal graph and the second spatio-temporal graph.

20. The one or more non-transitory storage media of claim 11, wherein the instructions, when executed by the one or more computing devices, further cause:

generating a first accuracy score based at least in part on an identification of the one or more keyframes;

generating a second accuracy score based at least in part on a localization of the one or more objects within the one or more input videos;

generating a third accuracy score based at least in part on a detection of the objects of interest within the individual frames of the one or more input videos;

generating a fourth accuracy score based at least in part on an identification of the one or more joint keypoints within the individual frames of the one or more input videos;

generating a fifth accuracy score for the graph neural network; and generating a sixth accuracy score for the classifier based at least in part on a comparison of a classification of an action within an input video with a ground-truth label for the action.

21. The one or more non-transitory storage media of claim 11, wherein training a classifier to identify one or more actions in the one or more input videos based at least in part on the spatial information and the temporal information further comprises:

training the classifier to identify a plurality of actions in one of the one or more input videos.

22. The one or more non-transitory storage media of claim 11, wherein the training of the second graph neural network comprises merging object-pose interaction graphs of subsets of frames, in the plurality of frames, associated with corresponding ones of the one or more keyframes, to introduce a temporal dimension to the one or more interactions.

* * * * *